United States Patent

Arnoth

[11] Patent Number: 5,988,012
[45] Date of Patent: Nov. 23, 1999

[54] CAM ACTIVATED ROTATIONAL GEAR LOCK

[76] Inventor: Frank W. Arnoth, 20 Concord Creek Rd., Glen Mills, Pa. 19342

[21] Appl. No.: 09/096,393

[22] Filed: Jun. 11, 1998

[51] Int. Cl.[6] .............. G05G 5/06; F16H 53/00; B62B 1/00
[52] U.S. Cl. .............. 74/527; 74/567; 280/650; 280/647
[58] Field of Search .............. 74/526, 527, 512, 74/567, 475; 24/590; 280/650, 647

[56] References Cited

U.S. PATENT DOCUMENTS

| | | | |
|---|---|---|---|
| 2,291,975 | 8/1942 | Minero | 248/158 |
| 3,470,524 | 9/1969 | Culver | 339/90 |
| 3,525,272 | 8/1970 | Olson | 74/530 |
| 3,596,013 | 7/1971 | Pihl | 200/11 EA |
| 4,202,227 | 5/1980 | Thumm . | |
| 4,709,454 | 12/1987 | Barnes | 24/590 |
| 4,770,057 | 9/1988 | Foggini | 74/523 |
| 4,944,073 | 7/1990 | Haug | 24/590 |
| 5,213,004 | 5/1993 | Hoblingre | 74/493 |
| 5,482,417 | 1/1996 | Erickson . | |
| 5,530,999 | 7/1996 | Barnes . | |
| 5,699,698 | 12/1997 | Geyer . | |
| 5,819,798 | 10/1998 | Claflin et al. | 74/527 X |
| 5,823,066 | 10/1998 | Huitema et al. | 74/527 |
| 5,884,533 | 3/1999 | Shyu et al. | 74/527 |

FOREIGN PATENT DOCUMENTS

| 856087 | 11/1952 | Germany | 74/527 |
|---|---|---|---|

*Primary Examiner*—Vinh T. Luong
*Attorney, Agent, or Firm*—Edward J. Kaliski

[57] ABSTRACT

The invention is a mechanism for selectively fixing the angular relationship of two pivotaly related structural members in finite steps using a manually actuated, cam-activated gear lock. This provides an adjustable and selectively lockable angular relationship. Fixed and moveable cylindrical cams and a concentric face gear/clutch are used. In one application, the mechanism is incorporated into a four bar linkage.

6 Claims, 9 Drawing Sheets

FIG. I.

CAM ACTIVATED ROTATIONAL GEAR LOCK

FIELD OF THE INVENTION

This invention relates to the field of mechanisms, particularly to means for selectively fixing the angular relationship of two members in finite steps, and more particularly to a manually-activated cam gear lock providing an adjustable, selectively lockable, angular relationship between two pivotally-related, structural members.

BACKGROUND OF THE INVENTION

A common problem for designers is the provision of an adjustable, rotational-relationship between two structural members. It can be especially important that this relationship between two structural elements be selectively adjustable and that the structure provides the ability to lock and unlock any selected angle at will. Various solutions are seen. The foot rests used in the seats of commercial aircraft are a typical application as is a means to adjust the rotational position of an arm relative to a frame from which it is fixed. Some examples of mechanisms from the prior art follow:

Geyer, in U.S. Pat. No. 5,699,698, teaches a logarithmic cam mounted on a shaft offset to permit unlocking.

Erickson, in U.S. Pat. No. 5,482,417, provides a self locking mechanism uses a shaft mounted cam with the cam surfaces on the periphery of a centrally opened cylinder.

Barnes, in U.S. Pat. No. 5,530,999, teaches an axial locking device with locking balls wherein slider teeth push against rotor teeth which are spring loaded.

Thumm, in U.S. Pat. No. 4,202,227, shows a mechanism in which an axial face of a driving ring has cam surfaces engageable with cam surfaces on a moveable locking ring which has gear teeth mating with teeth on a flange.

All of the above are serviceable solutions to the basic problem. All, however, lack the simplicity which is one object of the instant invention. Other objects of this invention are provision of a positive lock against torque applied to the members while maintaining a low unlocking force suitable to manual operation, and a relatively low cost to fabricate.

SUMMARY OF THE INVENTION

The invention is a cam actuated multi-position gear lock for a rotary member. An indexable arm is keyed to a rotatable shaft extending through a mounting plate fixed to a frame. A hollow cylindrical, radial-surface stationary cam is concentric with a bushing concentric with a clutch base. These are fixed to the mounting plate concentric with the shaft. The clutch base is a hollow cylindrical, radial gear. The gear teeth have sharp arrises. A matching gear/clutch half, is slideable on the shaft but fixed against rotation relative to the shaft and is compression-spring loaded. The spring is concentric with the shaft and thrusts against a washer fixed to the end of the shaft. As a result, the gear/clutch is normally engaged with the clutch base. An actuating, moveable cam is rotatably mounted on the periphery of the bushing and slideable with it being held in place by a throw-out plate fastened to the moveable gear/clutch half. When the cam actuating arm rotates the moveable cam the interaction between the moving and the fixed cam halves slidingly forces the cam half against the throwout plate forcing the moveable gear/clutch half to slide out of engagement. The spring is compressed against the washer. The indexing arm, now unlocked, may be rotated to a desired position. When the turning force on the cam is released, the compression spring forces the assembly closed locking the indexing arm in place.

In a preferred embodiment, the indexing arm and the plate in which the locking means is held are two bars in a four bar linkage which combination provides all the known positional advantages of these linkages with the advantages of the selective cam actuated gear lock rotational gear lock. In a further preferred embodiment, the lock of the invention is combined with a four bar linkage proportioned so that when installed on a wheelchair, the structure may be tilted while the swivel posts of the casters remain substantially vertical. This provides the physiological benefits of tilting to collapsible wheelchairs where previously the lack of a rigid frame prevented installation of a tilting mechanism.

BRIEF DESCRIPTION OF THE DRAWINGS

FIG. 8a is an enlarged perspective view of a gear/clutch half of the mechanism of FIG. 4.

FIG. 8b is a further enlarged view of the teeth of that gear/clutch half as indicated by the dashed circle in FIG. 8a.

DETAILED DESCRIPTION OF THE INVENTION

Figure 1:
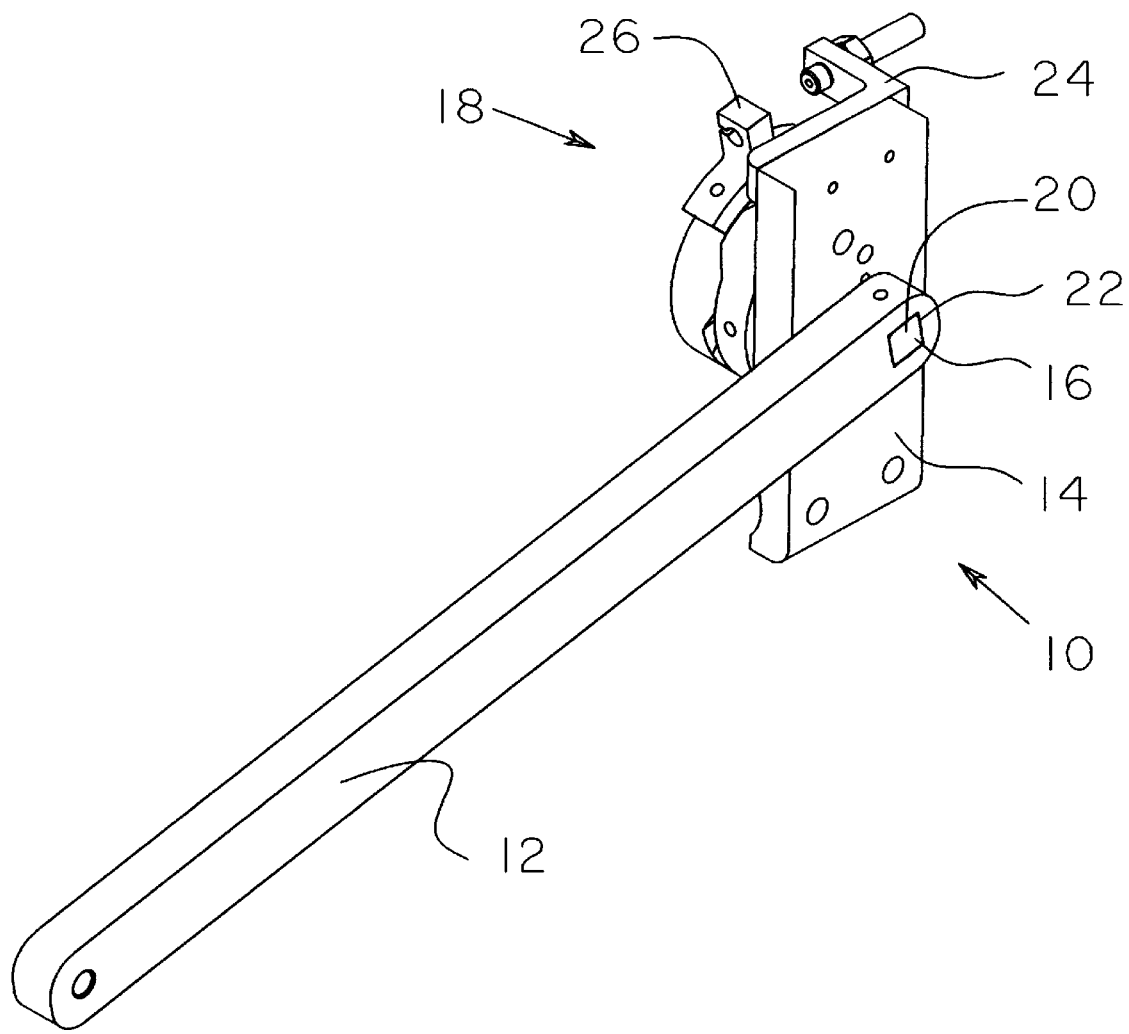
FIG. 1 is an isometric view of the mechanism of the invention

FIG. 1 shows the mechanism 10 of the invention. It comprises an indexable arm 12 pivotally mounted on a plate 14 by being fixed to a shaft 16. Also shaft mounted is a gear lock assembly 18. It is preferred to attach arm 12 to shaft 16 by using a square shaft end 20 in a corresponding square hole 22 in arm 12. Plate 14 may be attachable to a frame, not shown in the drawings, or a frame may substitute for it. Bracket 24 is fastened to plate 14 to anchor a flexible cable, not shown, which is connected to cam lever actuator 26 as will be described further.

Figure 2:
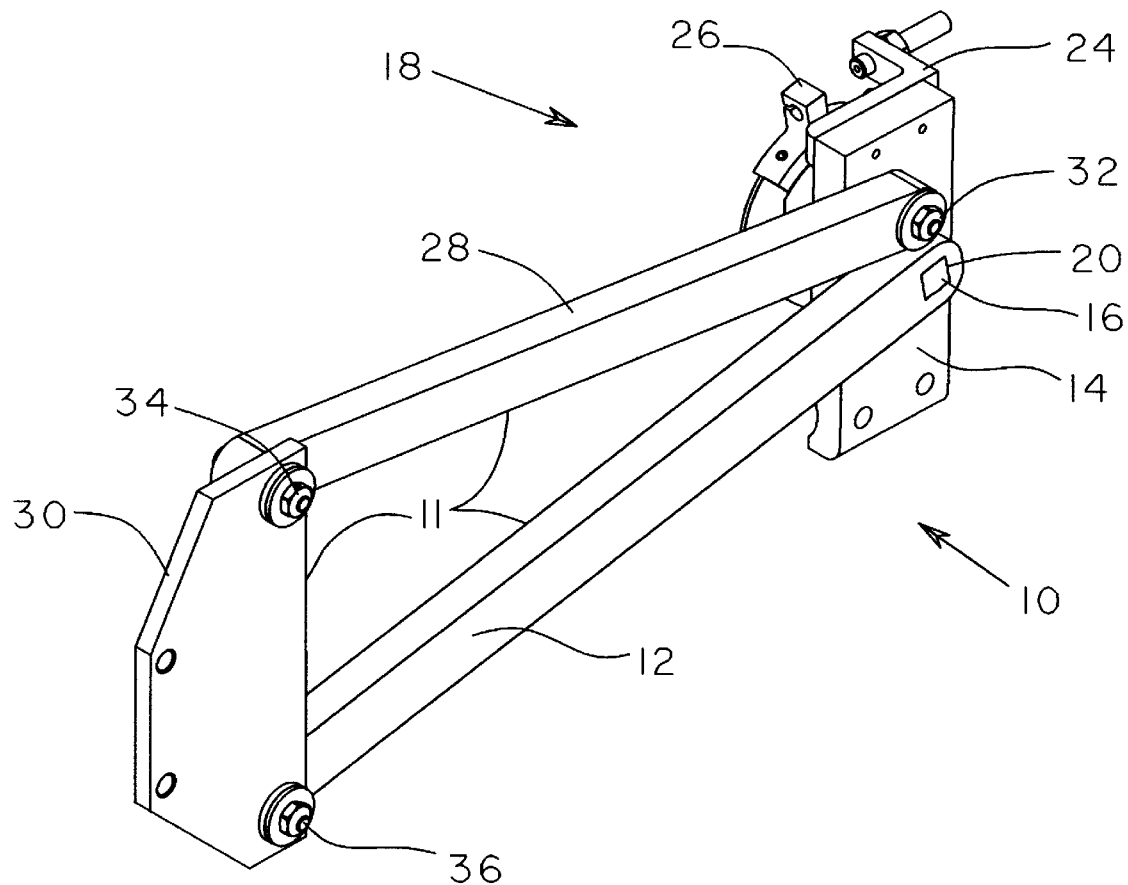
FIG. 2 is an isometric view of the mechanism of FIG. 1 shown fully assembled in a four bar linkage application.
Figure 3:
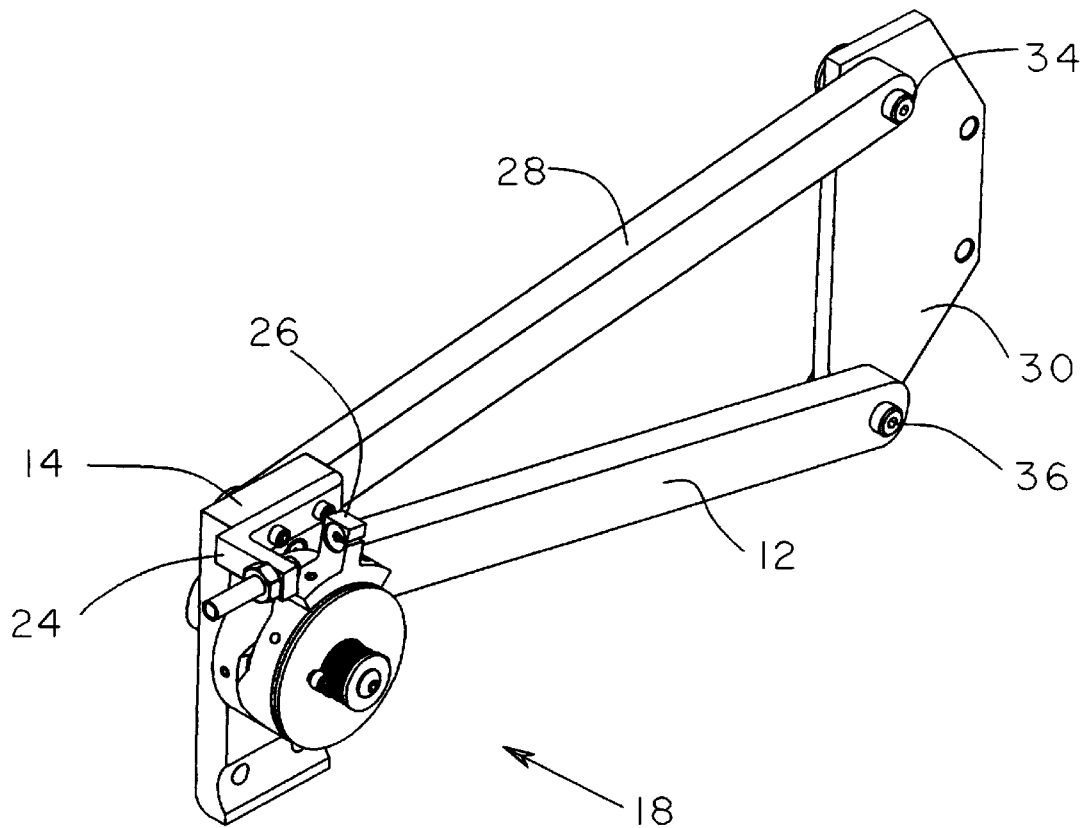
FIG. 3 is an isometric view of the back side of the mechanism of FIG. 2.

Mechanism 10 can be used simply as an indexing arm to change the position of a pulley or idler. A preferred embodiment of the invention is shown in FIG. 2 where it is incorporated into a four bar linkage 11. In this application, shown in FIGS. 3, 4, and 5 as well, four bar linkage 11 comprises follower arm 28 pivotally connected at both ends; to plate 14 at pivot 32 and to follower plate 30 at the other pivot 34. The linkage is closed by a pivotal connection 36 between follower plate 30 and indexable arm 12.

Figure 5:
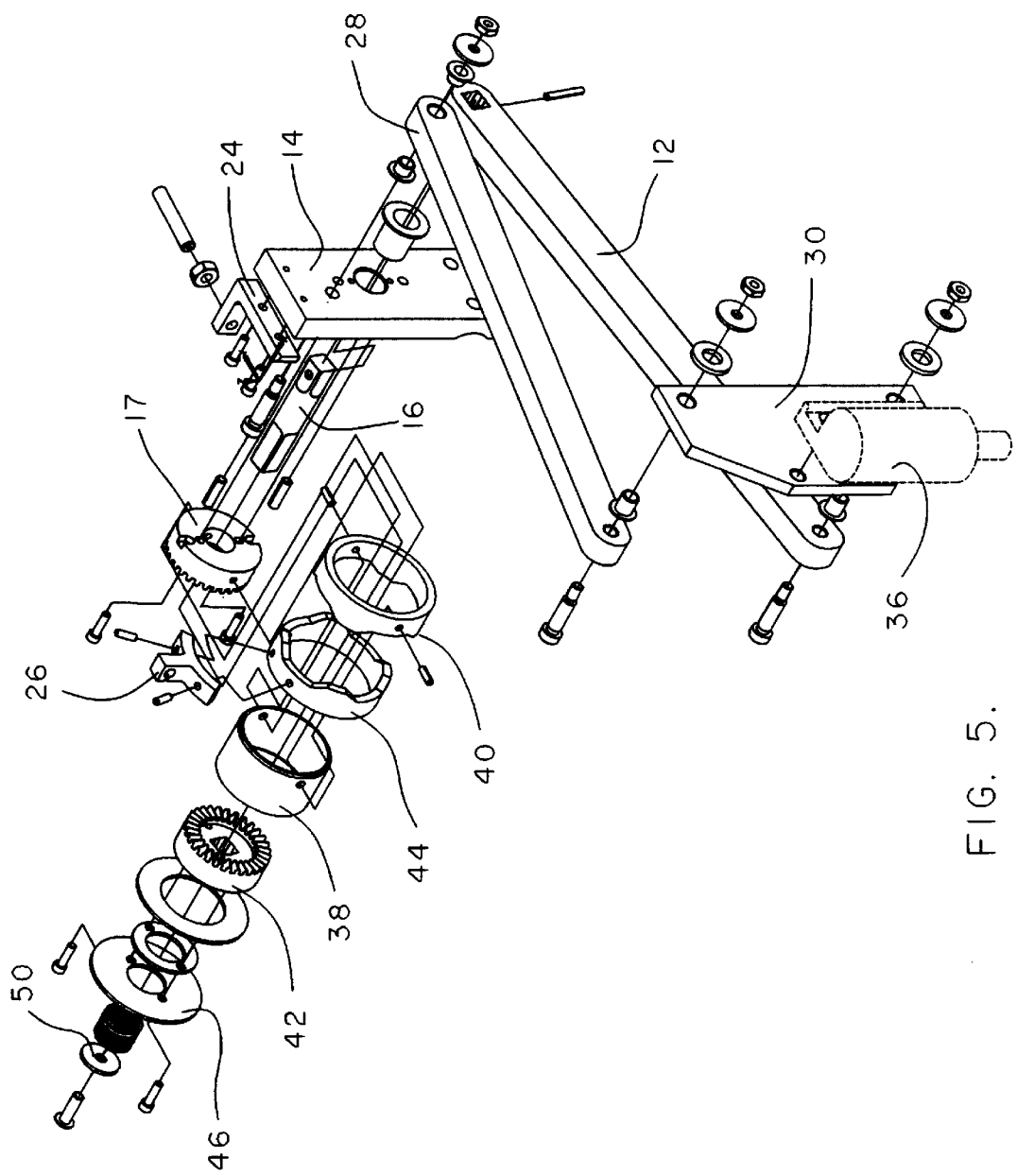
FIG. 5 is a fully exploded view of FIG. 3.
Figure 6:
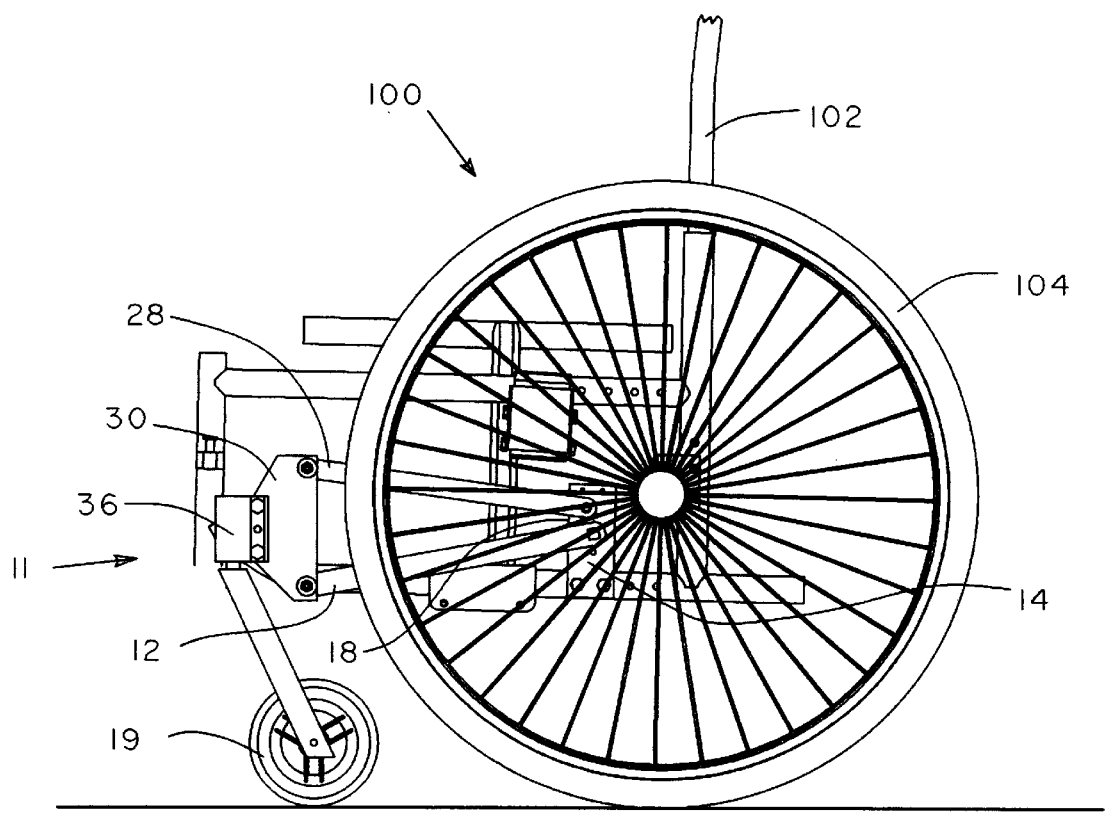
FIG. 6 is an elevational view of a tilt-in-space wheelchair incorporating the four bar linkage mechanism of FIG. 2 in the untilted position.
Figure 7:
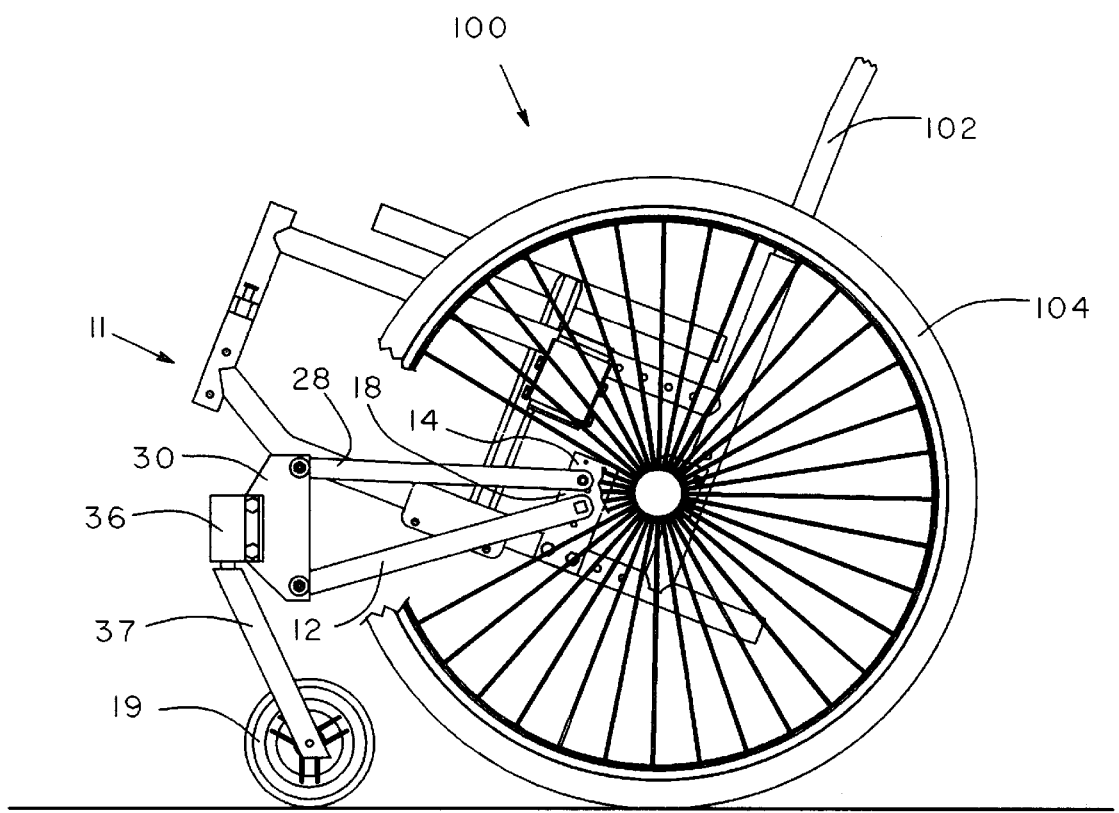
FIG. 7 is an elevational view of a tilt-in-space wheelchair incorporating the four bar linkage mechanism of FIG. 2 a tilted position with part of the wheel broken away for clarity.

The illustrated four bar linkage 11 is useful as a means to maintain the attitude of plate 30 substantially fixed relative to ground while plate 14 is moved through a range of angular rotation of up to about 45 degrees. In a practical application, mirror image linkages 11 can be provided on opposing sides of a wheel chair to permit selective tilting of the chair while the swivel posts 36 of the front casters 37 (see FIG. 5) which are fastened to follower plates 30 are held substantially perpendicular to the ground. Also see FIGS. 6 and 7 which show a typical tilt-in-space wheelchair 100 incorporating linkage 11 and gear lock assembly 18 in untilted and tilted positions respectively. This combination provides the advantages of tilting to collapsible wheelchairs. Wheelchair 100, so adapted, is the subject of patent application "Improved Tilt-in-Space Wheelchair" application Ser. No. 09/096,392, filed Jun. 11, 1998 the disclosure of which is included herein by reference.

Figure 4:
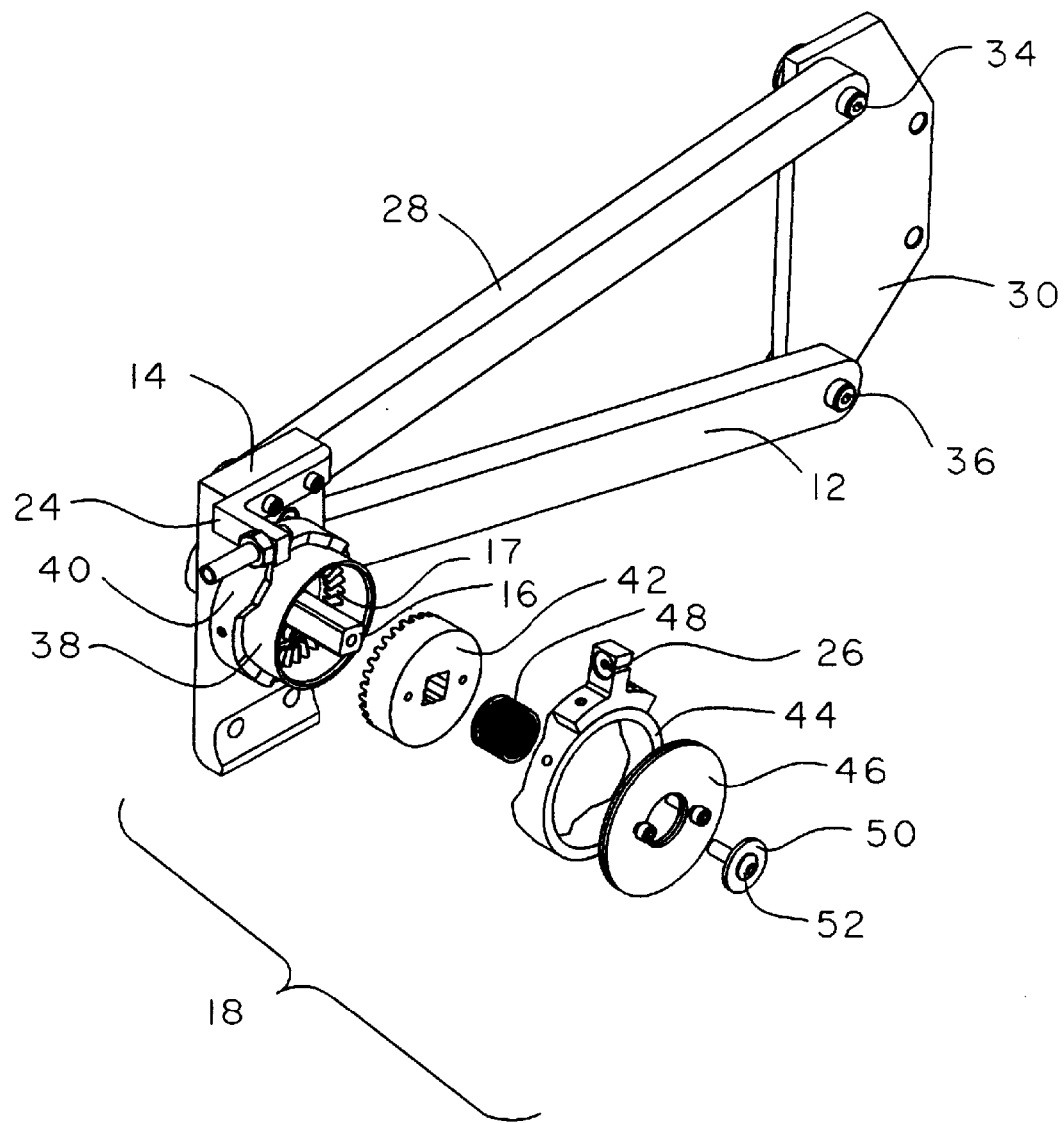
FIG. 4 is a partially exploded view of FIG. 3.

Refer now to FIG. 4. Cam actuated gear lock assembly 18 is shown in an exploded view. Three concentric elements are fixed to plate 14 to comprise a stationary clutch half surrounding shaft 16; face gear/clutch half 17, bushing 38 and fixed cam half 40. Moveable gear/clutch 42 is slideable on shaft 16 there being a square region for this purpose. A second moveable cam half 44 is slideable and rotatable on the outside of bushing 38. It carries cam lever actuator 26. Note that bushing 38 is optional and its function could be performed by a properly configured cylindrical surface peripheral to gear/clutch half 17. A second face-gear/clutch 42, which is slideable only relative to shaft 16, is fastened to throwout plate 46 and is biased toward plate 14 by compression spring 48 captured between gear 42 and washer 50 which is attached to shaft 16 by screw fastener 52.

Figures 8A, 8B:
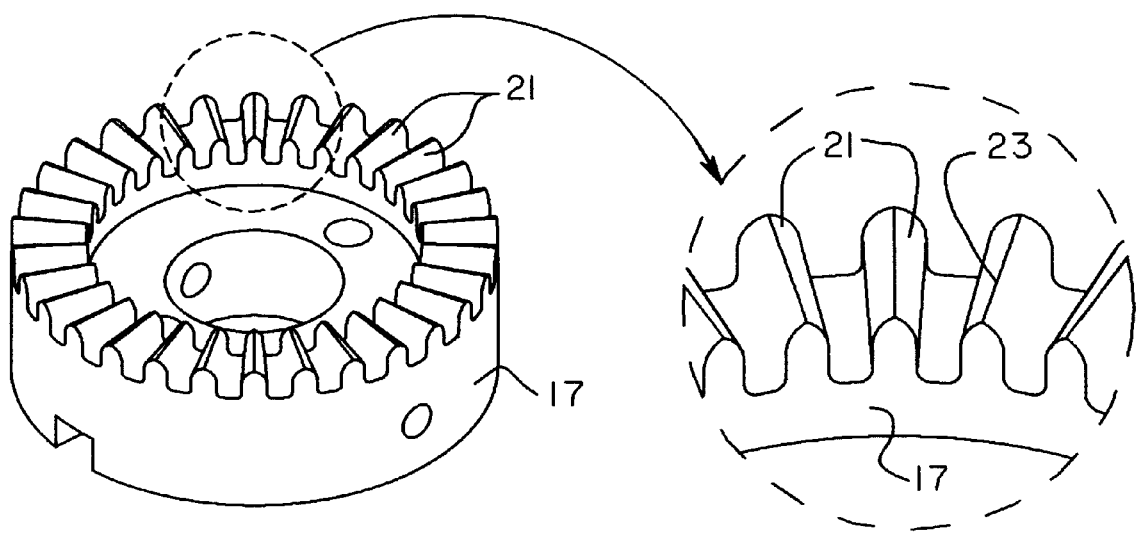
Figure 9:
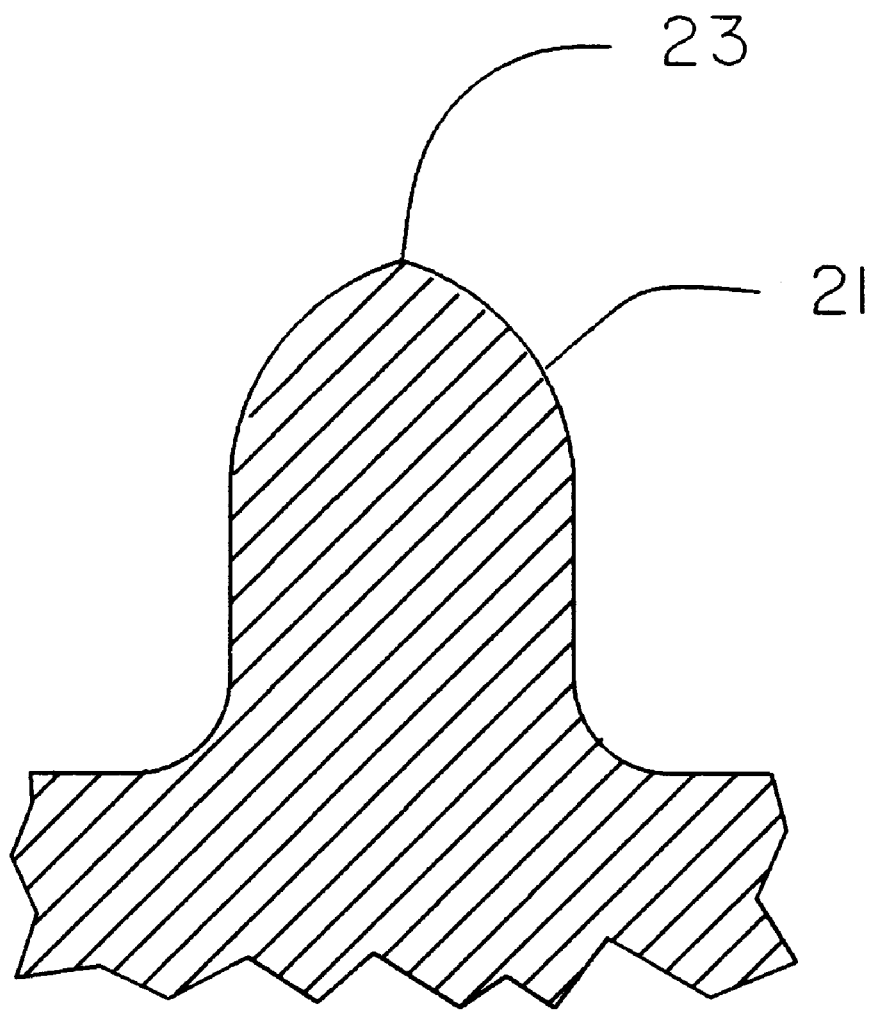
FIG. 9 is a still further enlarged cross-section of a single tooth of that gear/clutch half.

In use, the cam actuating arm 26 is rotated by manual means (a cable actuator not shown controlled by an attendant behind the chair is preferred). This turns the moveable cam 44 on bushing 38 and the interaction between the moving and the fixed cam halves (44, 40) slidingly forces the cam half against the throwout plate 46 forcing the moveable gear/clutch half 42 to slide out of engagement with the fixed gear/clutch half 17. The spring 48 is compressed against washer 50. The indexing arm 12, now unlocked, may be rotated to a desired position. When the turning force on cam 44 is released, compression spring 48 forces the gear/clutch halves (17, 42) closed locking the indexing arm 12 in place. To facilitate easy meshing of the gear/clutch halves, the teeth 21 are provided with sharp arrises 23 (see FIGS. 8a, 8b, and 9). The mating gear surfaces contact at a locking angle. This locks arm 12 against rotation under the thrust of spring 48. The mating cam halves contact at a non-locking angle. Thus it is easy to rotate cam half 44 and easy for the cam half to slide outward to compress spring 48 and unlock arm 12. To insure a positive release it is preferred that the means to rotate cam 44 also be spring loaded towards the locked position as by a compression spring (not shown) in the preferred cable actuator (not shown).

What is claimed is:

1. A cam-activated gear lock mechanism for pivotally-related structural members comprising:

an indexable arm (12) fixed to a shaft (16) rotatable in a plate (14) there being fixed to said plate (14) both a first face-gear/clutch half (17) and a first cylindrical cam half (40) concentric with said first face-gear/clutch half (17);

a second cylindrical cam half (44) complimentarily mating with said first cylindrical cam half (40) and rotatably and slideably located relative said shaft (16);

manual means (26) to selectively rotate said second cylindrical cam half (44);

a second face-gear/clutch half (42) slideably disposed on said shaft (16) and rotationally fixed relative thereto, said first and second face-gear/clutch halves (17, 42) meshable one with the other;

a throwout plate (46) fastened to said second face-gear/clutch half (42) and bearing on said second cylindrical cam half (44) constraining said second face-gear/clutch half (42) to move slideably with said second cylindrical cam half (44); and a compression spring (48) concentric to said shaft (16), the proximal end thereof biasing said second face-gear/clutch half (42) toward said first face-gear/clutch half (17) and said second cylindrical cam half (44) toward said first cylindrical cam half (40), the distal end of said spring (48) axially constrained by means associated with said shaft (16);

whereby there is provided an adjustable, selectively-lockable, angular relationship between pivotally-related, structural members (12, 14).

2. The mechanism of claim 1 wherein there is a bushing (38) externally concentric with said fixed first face gear/clutch half (17) and internally concentric with said cam halves (40, 44).

3. The mechanism of claim 1 in rotational combination with a four bar linkage (11), said indexable arm (12) and said plate (14) comprising links thereof.

4. The mechanism of claim 1 in rotational combination within a four bar linkage (11), said indexable arm (12) and said plate (14) comprising links thereof.

5. The mechanism of claim 2 wherein the teeth of said gear/clutches (17, 42) have sharp arisses.

6. The mechanism of claim 1 wherein the teeth of said gear/clutches (17, 42) have sharp arises.

* * * * *

UNITED STATES PATENT AND TRADEMARK OFFICE
CERTIFICATE OF CORRECTION

PATENT NO : 5,988,012
DATED : Nov. 23, 1999
INVENTOR(S) : ARNOTH

It is certified that error appears in the above-identified patent and that said Letters Patent is hereby corrected as shown below:

In Claim 4 change "claim 1" to –claim 2-.

Signed and Sealed this

Tenth Day of October, 2000

Attest:

Q. TODD DICKINSON

Attesting Officer  Director of Patents and Trademarks